United States Patent
Shih et al.

(10) Patent No.: US 9,325,910 B2
(45) Date of Patent: Apr. 26, 2016

(54) PHOTOGRAPHING DEVICE AND LAMP DEVICE THEREOF

(71) Applicant: VIVOTEK INC., New Taipei (TW)

(72) Inventors: Li-Shan Shih, New Taipei (TW);
Wen-Yuan Li, New Taipei (TW);
Hsuen-Chun Lu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 46 days.

(21) Appl. No.: 14/320,062

(22) Filed: Jun. 30, 2014

(65) Prior Publication Data

US 2015/0009398 A1    Jan. 8, 2015

(30) Foreign Application Priority Data

Jul. 3, 2013  (TW) .............................. 102123896 A

(51) Int. Cl.
*H04N 5/225* (2006.01)
*H04N 5/235* (2006.01)

(52) U.S. Cl.
CPC ........... *H04N 5/2354* (2013.01); *H04N 5/2252* (2013.01); *H04N 5/2256* (2013.01)

(58) Field of Classification Search
CPC . H04N 5/2354; H04N 5/2256; H04N 5/2252; A61B 1/04; A61B 1/06; A61B 1/0607; A61B 1/0615; A61B 1/0623; A61B 1/0684
USPC ............. 348/370–376; 396/61, 176, 177, 178
See application file for complete search history.

(56) References Cited

U.S. PATENT DOCUMENTS

| 2011/0128402 A1* | 6/2011 | Lim | H04N 5/2256 348/222.1 |
| 2014/0334161 A1* | 11/2014 | Zhou | F21K 9/137 362/311.02 |

FOREIGN PATENT DOCUMENTS

| TW | I378212 B | 12/2012 |
| WO | 2014048018 A1 | 4/2014 |

* cited by examiner

*Primary Examiner* — Yogesh Aggarwal
(74) *Attorney, Agent, or Firm* — Locke Lord LLP; Tim Tingkang Xia, Esq.

(57) ABSTRACT

The disclosure provides a photographing device which includes a main body, an image capturing module, a lighting module and a reflection module. The main body includes a substrate. The image capturing module is disposed on the main body. The lighting module is disposed on the substrate. The reflection module includes a cover movably disposed on the main body, for making the cover have a first position and a second position relative to the main body. The cover includes a first reflecting component and a second reflecting component. The first and the second reflecting components are adapted to make beams emitted from the lighting module form a first illumination and a second illumination field when the cover is located at the first position and the second position respectively. Accordingly, the lighting module has at least two illumination fields different from each other.

19 Claims, 10 Drawing Sheets

PHOTOGRAPHING DEVICE AND LAMP DEVICE THEREOF

CROSS-REFERENCE TO RELATED APPLICATIONS

This non-provisional application claims priority under 35 U.S.C. §119(a) on Patent Application No(s). 102123896 filed in Taiwan, R.O.C. on Jul. 3, 2013, the entire contents of which are hereby incorporated by reference.

BACKGROUND

1. Technical Field

The disclosure relates to a photographing device and a lamp device thereof. More particularly, the disclosure relates to a photographing device and a lamp device adapted to adjust illumination fields.

2. Related Art

With the development of technology, the surveillance cameras are widely used in security monitoring. For example, the surveillance cameras are necessary for personal safety and property protection in families, companies, government agencies, and even general public places. Generally speaking, surveillance cameras can monitor actions in the monitored environment to capture every event.

In order to monitor the actions in the monitored environment clearly, a surveillance camera can comprise a variable-focus lens module. A user can adjust the focal length of the variable-focus lens module to zoom in or zoom out when capturing an image. Accordingly, the user can monitor a specific object in the monitored environment clearly.

Additionally, the monitoring camera can comprise an auxiliary light source. The auxiliary light source can emit beams to illuminate the monitored environment or the specific object. In other words, the auxiliary light source can provide beams with proper brightness and proper illumination area to improve the quality of the image captured by the surveillance camera.

When the surveillance camera adjusts the variable-focus lens module to change the field of view of the monitored environment where the surveillance camera captures, if the illumination field of the auxiliary light source cannot be adjusted relatively, the monitored environment is not bright enough to make the surveillance camera capture the image clearly.

Therefore, it is necessary to provide a surveillance camera with an auxiliary light source whose illumination fields can be adjusted relative to the focal length of a lens module, to improve the problem of insufficient brightness in a monitored environment.

SUMMARY

An embodiment of the disclosure provides a photographing device which comprises a main body, an image capturing module, a lighting module and a reflection module. The main body comprises a substrate. The image capturing module is disposed on the main body. The lighting module is disposed on the substrate. The reflection module comprises a cover movably disposed on the main body, for making the cover have a first position and a second position relative to the main body. The cover comprises a first reflecting component and a second reflecting component. The first reflecting component is adapted to make beams emitted from the lighting module form a first illumination field when the cover is located at the first position. The second reflecting component is adapted to make beams emitted from the lighting module form a second illumination field when the cover is located at the second position. Accordingly, the lighting module has at least two illumination fields that are different from each other.

Another embodiment of the disclosure provides a lamp device circuit. The lamp device comprises a main body, a lighting module and a reflection module. The lighting module is disposed on the main body. The reflection module comprises a cover movably disposed on the main body, for making the cover have a first position and a second position relative to the main body. The cover comprises a first reflecting component and a second reflecting component. The first reflecting component is adapted to make beams emitted from the lighting module form a first illumination field when the cover is located at the first position. The second reflecting component is adapted to make beams emitted from the lighting module form a second illumination field when the cover is located at the second position. Accordingly, the lighting module has at least two illumination fields different from each other.

BRIEF DESCRIPTION OF THE DRAWINGS

The disclosure will become more fully understood from the detailed description given herein below and the accompanying drawings which are given by way of illustration only and thus are not limitative of the disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides a photographing device and a lamp device thereof. The lamp device is adapted to emit beams to illuminate a specific object or a specific environment. Accordingly, the photographing device can be adapted to capture images of the specific object or the specific environment with sufficient brightness.

Figure 1:
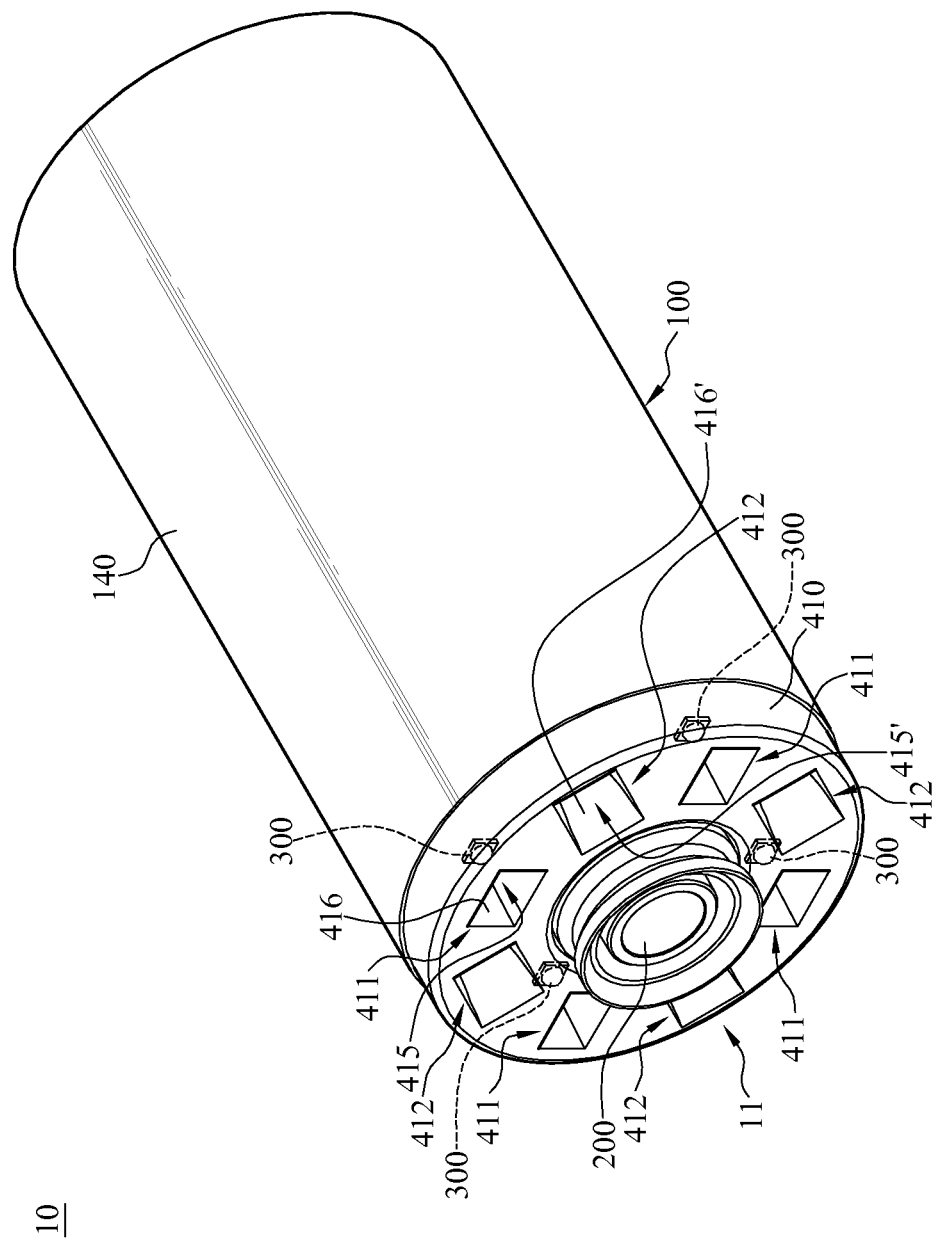
FIG. 1 is a perspective view of a photographing device according to a first embodiment of the disclosure.
Figure 2A:
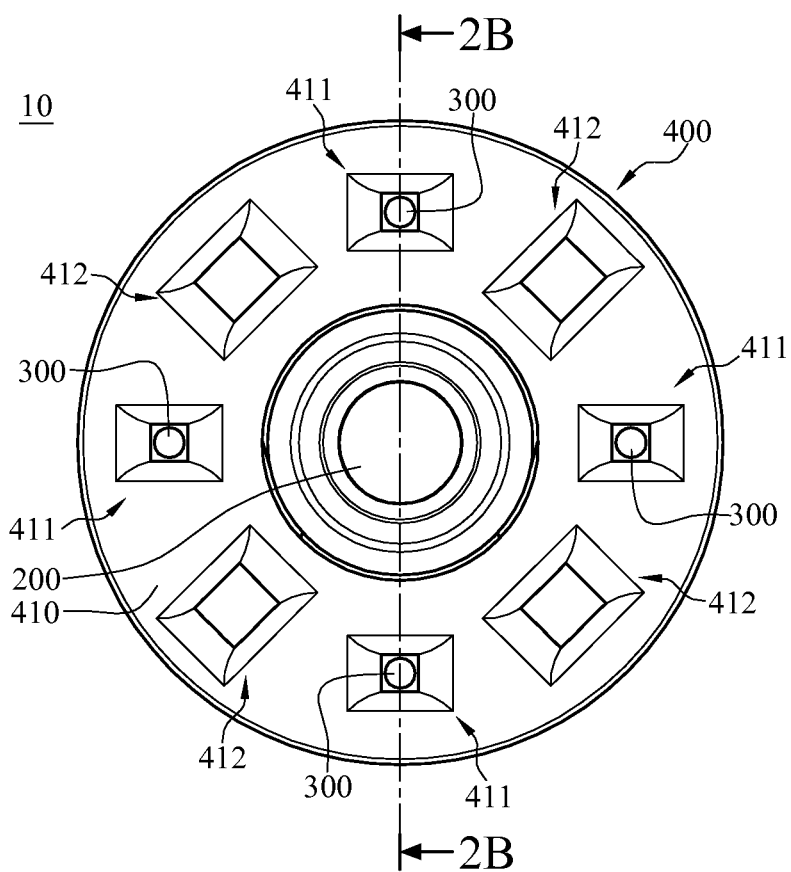
FIG. 2A is a front view of the photographing device in a first action according to the first embodiment of the disclosure.
Figure 2B:
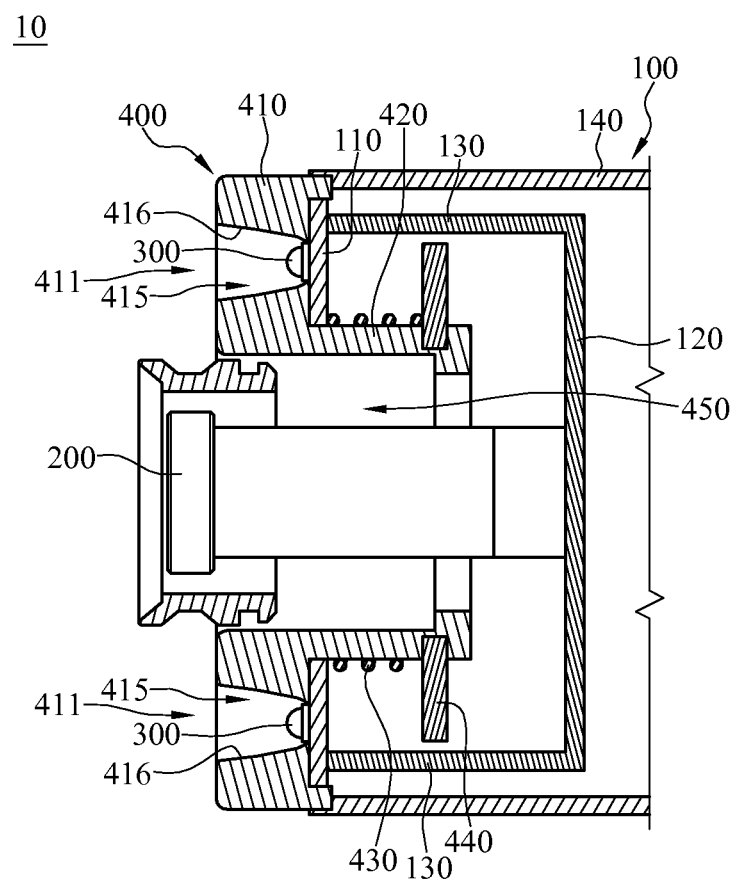
FIG. 2B is a sectional view of FIG. 2A along a section line 2B-2B of the disclosure.

Please refer to FIG. 1, FIG. 2A and FIG. 2B. FIG. 1 is a perspective view of a photographing device according to a first embodiment of the disclosure. FIG. 2A is a front view of the photographing device in a first action according to the first embodiment of the disclosure. FIG. 2B is a sectional view of FIG. 2A along a section line 2B-2B of the disclosure. In an embodiment of the disclosure, a photographing device 10 comprises a lamp device 11 and an image capturing module 200. The image capturing module 200 is disposed on the main body 100. The lamp device 11 comprises a main body 100, four lighting modules 300 and a reflection module 400. However, the disclosure is not limited to the quantity of the lighting modules 300. In other embodiments, the quantity of the lighting modules 300 is a positive integer lager or equal to one.

In this embodiment, the main body 100 comprises a substrate 110, a body 120, two connecting frames 130 and a shield 140. The body 120 is connected with the substrate 110 via the two connecting frames 130. The shield 140 covers the body 120 and the connecting frames 130, for prevent external particles or dust from entering the main body 100. The image capturing module 200 is disposed on the main body 100. The four lighting modules 300 are disposed on the substrate 110, respectively. The reflection module 400 comprises a cover 410. The cover 410 is movably disposed on the main body 100, for making the cover 410 have a first position and a second position relative to the main body 100. In this embodiment, the cover 410 is adapted to rotate about the main body 100 as an axis. Additionally, the cover 410 comprises four first reflecting components 411 and four second reflecting components 412 that are arranged alternatively in sequence in a ring shape. The shape of the first reflecting components 411 is different from the shape of the second reflecting components 412. Furthermore, the four lighting modules 300 are disposed on the four corners of the substrate 110 evenly. The four second reflecting components 412 are disposed between the four first reflecting components 411, respectively. In other words, the four first reflecting components 411 and the four second reflecting components 412 are disposed alternately. Moreover, the four relative positions of the four first reflecting components 411 and the four relative positions of the four reflecting components 412 respectively correspond to the four lighting modules 300. Additionally, the lighting modules 300 can be, but not limited to, light emitting diode modules or infrared modules.

The cover 410 will be described in detail as follows. In this embodiment, the cover 410 comprises at least two openings 415 and 415'. The openings 415 and 415' both include an inner wall surface 416 and 416' with inclination angles different from each other, to form the first reflecting components 411 and the second reflecting components 412 with reflection fields different from each other accordingly. Thus, the beams emitted from the lighting module 300 can be adapted to form the first illumination field or the second illumination field selectively by the first reflecting components 411 or the second reflecting components 412.

Other structures and configurations of the reflection module 400 will be described in detail as follows. The reflection module 400 further comprises a seat body 420, a blocking component 440 and an elastic component 430. The seat body 420 penetrates the substrate 110 and the elastic component 430. In other words, the elastic component 430 and the blocking component 440 sleeve on the seat body 420. The cover 410 is fixedly connected to an end of the seat body 420, and the blocking component 440 is fixedly connected to another end of the seat body 420. The substrate 110 is disposed between the blocking component 440 and the cover 410. An end of the elastic component 430 is disposed on the blocking component 440, and the other end of the elastic component 430 is connected with and pressed against the substrate 110. In this embodiment, the elastic component 430 is a compression spring. Additionally, the cover 410 and seat body 420 are formed integrally into a single unit, but the disclosure is not limited thereto.

Furthermore, the reflection module 400 includes a through hole 450 which is formed between the cover 410 and the seat body 420. In other words, the through hole 450 is formed inside the cover 410 and the seat body 420. An end of the image capturing module 200 is disposed on the body 120. The through hole 450 faces the image capturing module 200, and the image capturing module 200 is adapted to penetrate the cover 410 and the seat body 420 through the through hole 450 to capture an image from outside.

Figure 5A:
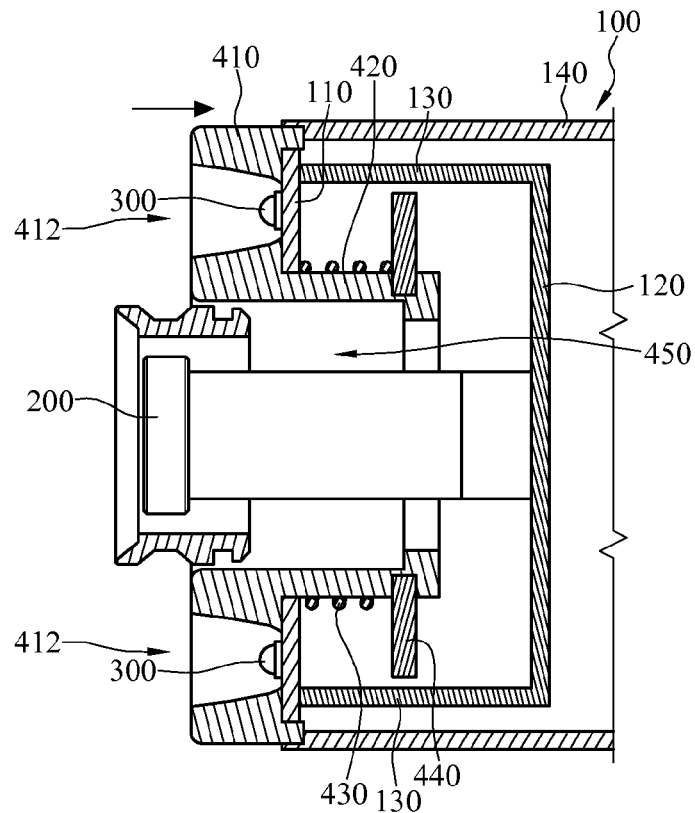
FIG. 5A is a sectional view of the photographing device in a fourth action according to the first embodiment of the disclosure.
Figure 5B:
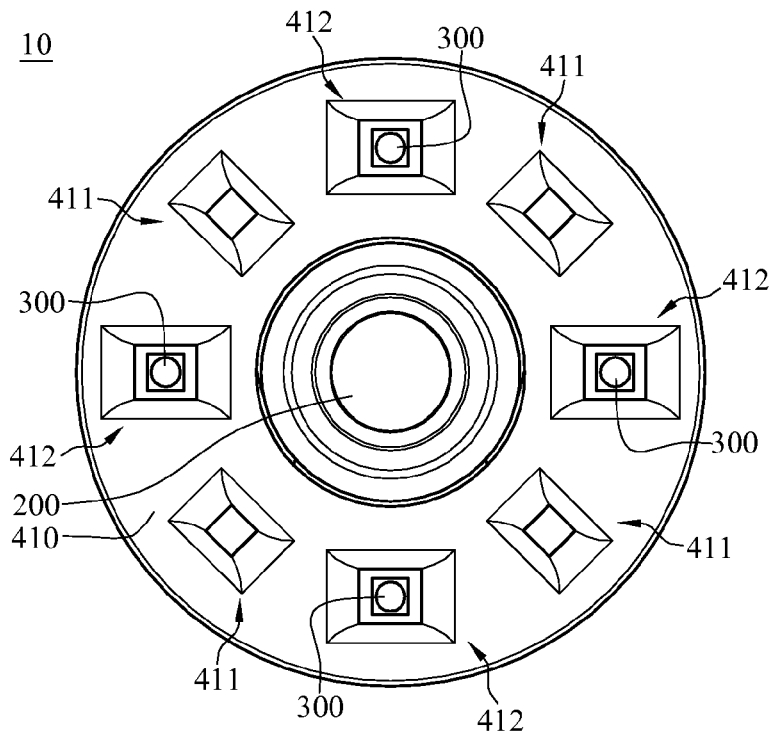
FIG. 5B is a front view of the photographing device in the fourth action according to the first embodiment of the disclosure.

The actuation and movement of the cover 410 will be described in detail as follows. Please refer to the FIG. 1, FIG. 2A and FIG. 2B. In this embodiment, the cover 410 is adapted to rotate about the image capturing module 200 as an axis in the main body 100, such that the cover 410 has a first position (as shown in FIG. 1, FIG. 2A, FIG. 2B) and a second position (as shown in FIG. 5A and FIG. 5B, FIG. 5A is a sectional view of the photographing device in a fourth action according to the first embodiment of the disclosure, FIG. 5B is a front view of the photographing device in the fourth action according to the first embodiment of the disclosure) relative to the main body 100. As shown in FIG. 1, when the cover 410 is located at the first position, the four first reflecting components 411 are located at illumination paths of the beams emitted by the lighting module 300. In other words, the four first reflecting components 411 are adapted to make the beams emitted from the four lighting modules 300 form the first illumination field when the cover 410 is located at the first position.

Figure 3:
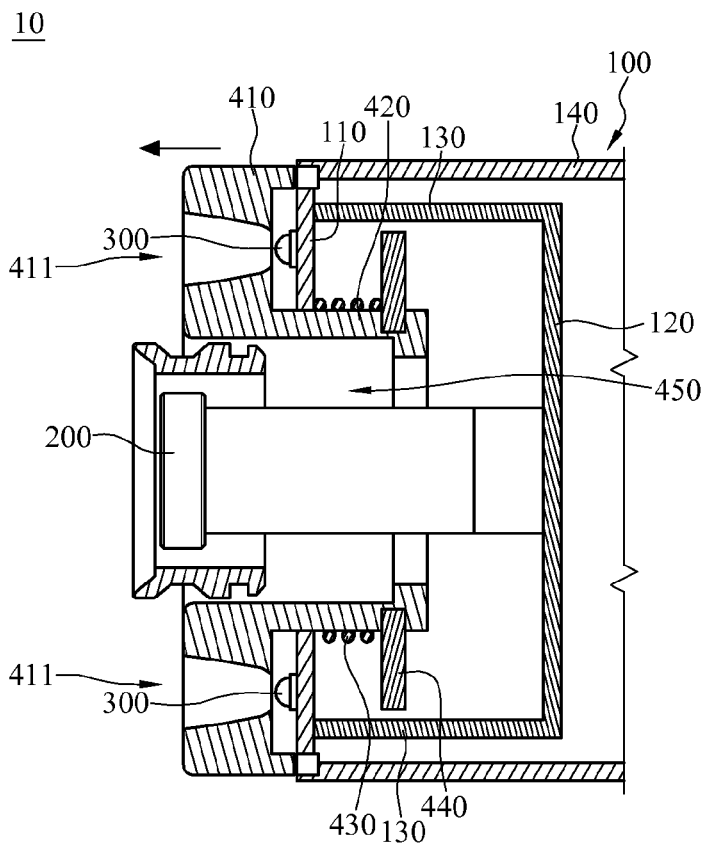
FIG. 3 is a sectional view of the photographing device in a second action of according to the first embodiment of the disclosure.

Please refer to FIG. 3, which is a sectional view of the photographing device in a second action of according to the first embodiment of the disclosure. A user may apply an external force, to pull up the cover 410 from the substrate 110 of the main body 100. Then, the lighting module 300 is removed from the first reflecting component 411, and the elastic component 430 is compressed by a force generated by the substrate 110 corresponding to the external force applied by the user.

Figure 4:
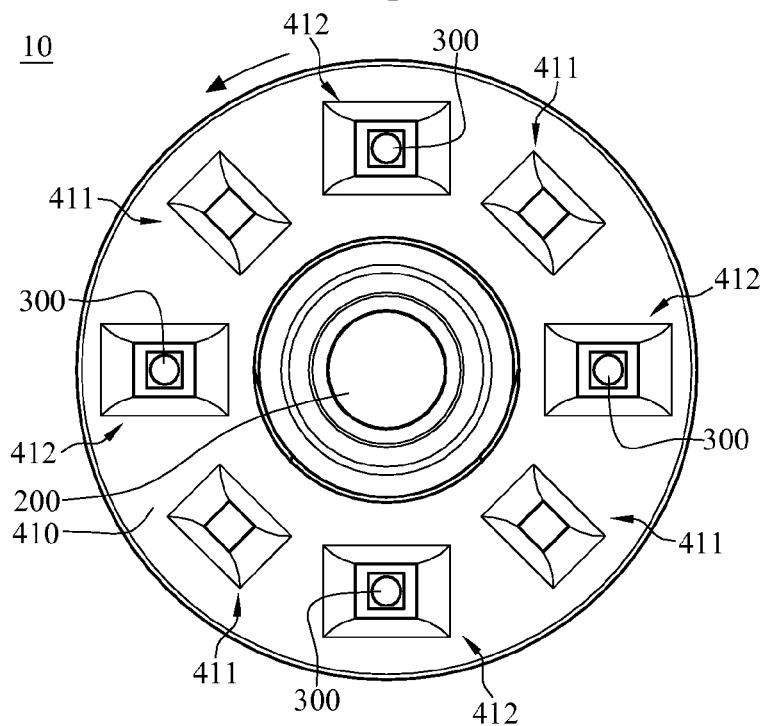
FIG. 4 is a front view of the photographing device in a third action according to the first embodiment of the disclosure.

Please refer to FIG. 4, which is a front view of the photographing device in a third action according to the first embodiment of the disclosure. The user can further operate the pulled up cover 410 to rotate about the image capturing module 20 as an axis by an angle via the external force, to make the cover 410 move to the second position. Then, the four lighting modules 300 face and correspond to the four second reflecting components 412, respectively.

Please refer to FIG. 5A and FIG. 5B, FIG. 5A is a sectional view of the photographing device in a fourth action according to the first embodiment of the disclosure, and FIG. 5B is a front view of the photographing device in the fourth action according to the first embodiment of the disclosure. When the external force is removed by the user, the cover 410 is recovered by a restoring force provided by the elastic component 430, such that the cover 410 and the main body 100 are contacted with each other. Accordingly, the four lighting modules 300 enter the second reflecting components 412, respectively. Additionally, the second reflecting components 412 are located at the illumination paths of the beams emitted by the lighting modules 300. When the cover 410 is located at the second position, the second reflecting component 412 is adapted to make beams emitted from the lighting module 300 form a second illumination field, so that each lighting module 300 has two illumination fields different from each other. Accordingly, each lighting module 300 has two illumination fields in accordance with the change of the focal length of the capturing module 200, such that the quality of images captured by the photographing device 10 can be improved.

Figure 6:
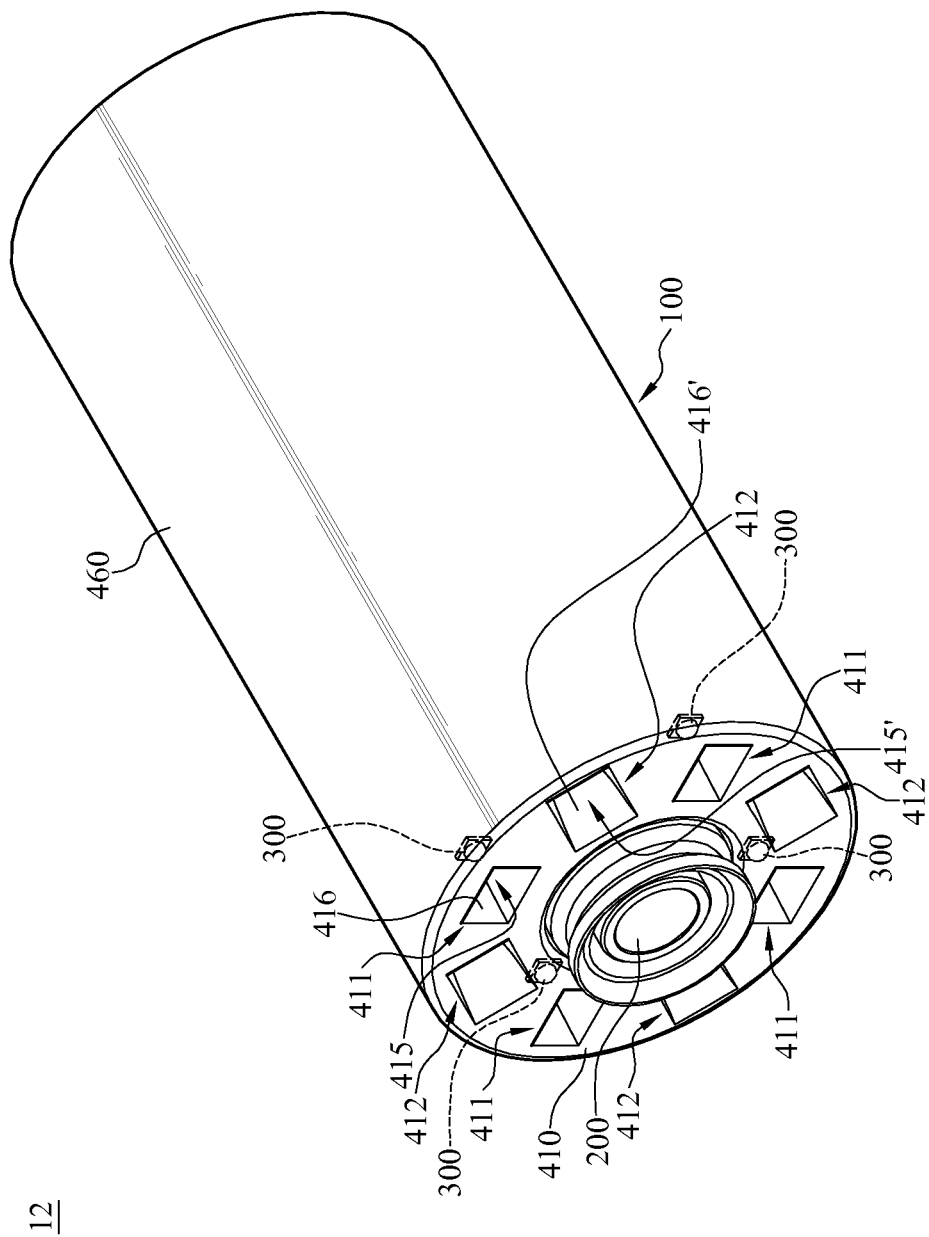
FIG. 6 is a perspective view of the photographing device according to a second embodiment of the disclosure.
Figure 7A:
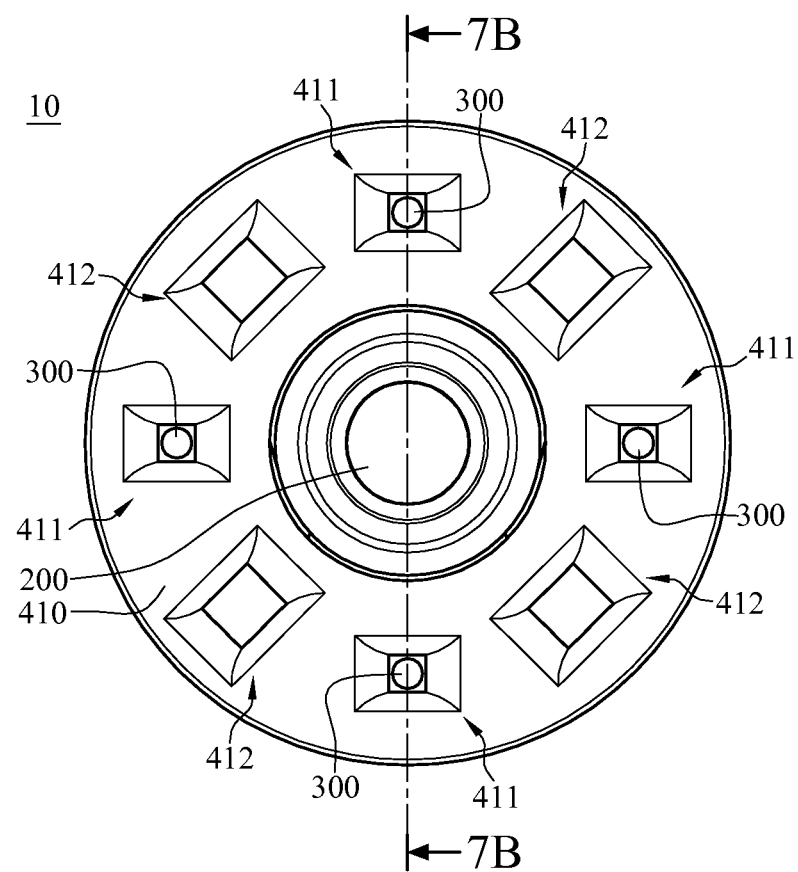
FIG. 7A is a front view of the photographing device shown in FIG. 6 of the disclosure.
Figure 7B:
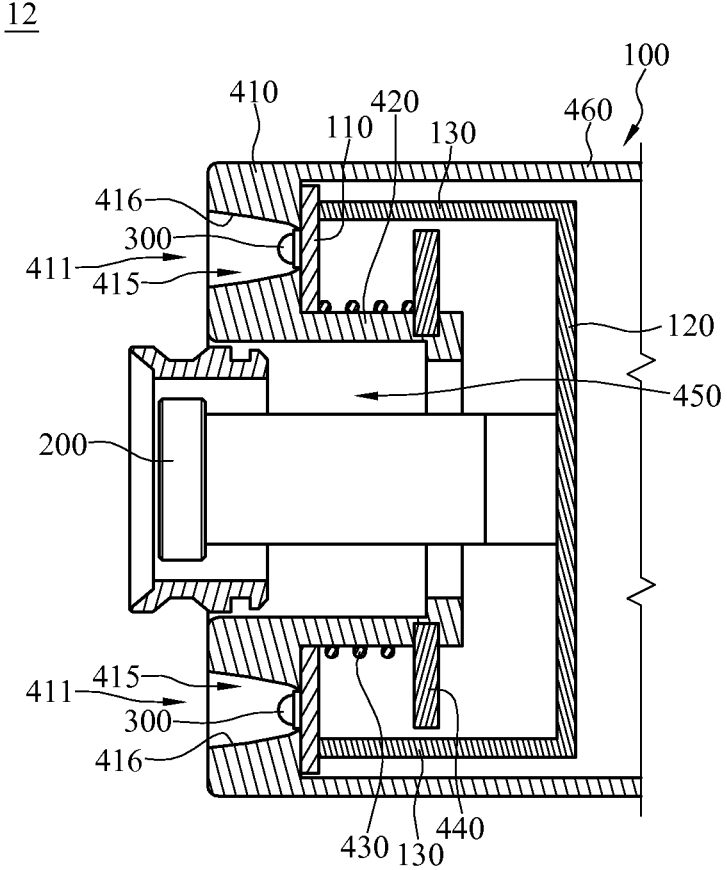
FIG. 7B is a sectional view of the photographing device in FIG. 7A along a section line 7B-7B of the disclosure.

However, the disclosure is not limited by the said structures. Please refer to FIG. 6, FIG. 7A and FIG. 7B. FIG. 6 is a perspective view of the photographing device according to a second embodiment of the disclosure. FIG. 7A is a front view of the photographing device shown in FIG. 6 of the disclosure. FIG. 7B is a sectional view of the photographing device in FIG. 7A along a section line 7B-7B of the disclosure. The structures and configurations in this embodiment are similar to those in the first embodiment, so that the same symbols mean the similar components of the photographing device 10 and it will not be repeated in this embodiment again. In this embodiment, the cover 410 comprises a tubular housing 460. The seat body 420 and the main body 100 are surrounded by the tubular housing 460. Accordingly, the tubular housing 460 is adapted to replace the shield 140, and the photographing device 12 can prevent the external particles and dust from entering the main body 100 by the tubular housing 460 according to this embodiment.

Figure 8:
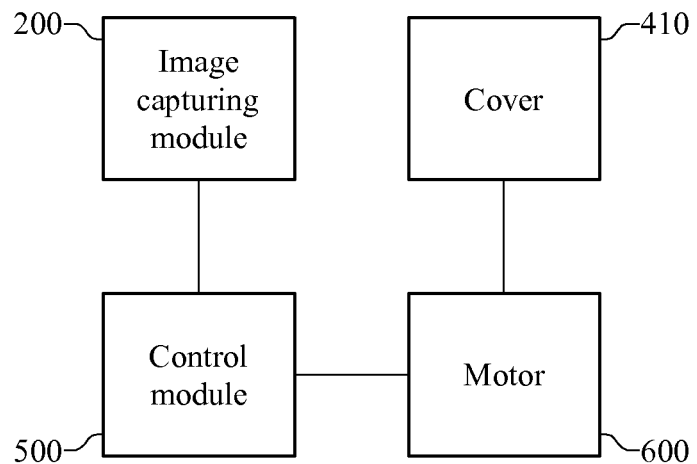
FIG. 8 is a partially block diagram of a photographing device according to a third embodiment of the disclosure.

Additionally, in the above-mentioned embodiments, the cover 410 is moved manually, but the disclosure is not limited to thereto. Please refer to the FIG. 1 and FIG. 8, FIG. 8 is a partial block diagram of a photographing device according to a third embodiment of the disclosure. In this embodiment, the photographing device 13 further comprises a control module 500 and a motor 600. Two ends of the control module 500 are connected with the motor 600 and the image capturing module 200, respectively. The motor 600 is connected with the cover 410 and adapted to drive the cover 410 to move relative to the main body 100. The lighting module 300 is adapted to selectively correspond to and face the first reflecting component 411 or the second reflecting component 412. When the image capturing module 200 adjusts the focal length manually or automatically, the control module 500 drives the motor 600 according to different focal lengths of the image capturing module 200, such that the motor 600 drives the cover 410 to move relative to the main body 100. In other words, the cover 410 may move automatically in accordance with the change of the focal length of the image capturing module 200. As a result, the illumination fields can be changed according to the lighting module 300 which selectively correspond to the first reflecting component 411 or the second reflecting component 412. Thus, the focal length of the image capturing module 200 is adapted to adjust the illumination fields of the lighting module 300. The application of the motor 600 can be readily accomplished by a person having ordinary knowledge in the art, and it will not be repeated again in this embodiment.

Figure 9:
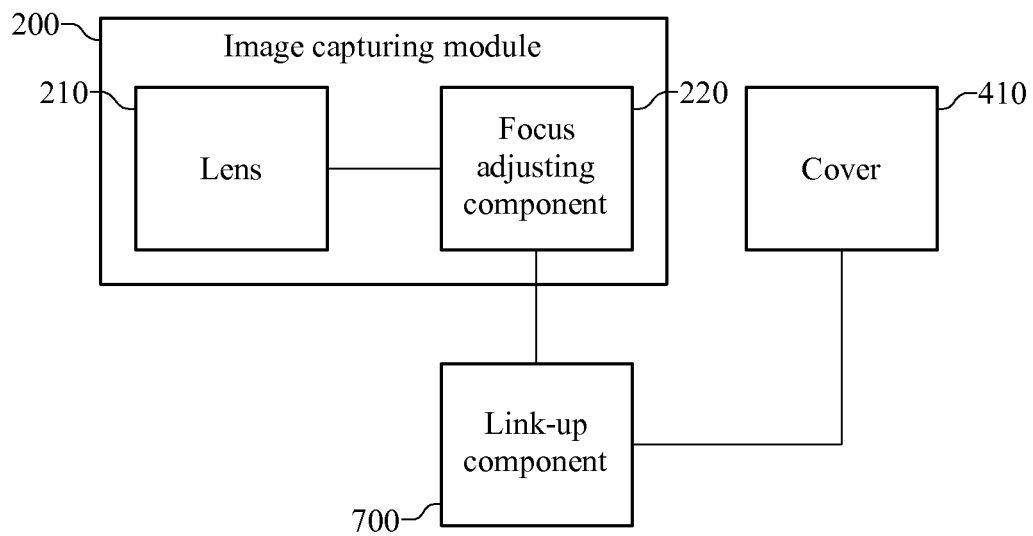
FIG. 9 is a partially block diagram of a photographing device according to a fourth embodiment of the disclosure.

In addition to the said structures, the cover 410 can be linked up by other components. Please refer to FIG. 1 and FIG. 9. FIG. 9 is a partially block diagram of a photographing device according to a fourth embodiment of the disclosure. In this embodiment, the photographing device 14 further comprises an image capturing module 200 and a link-up component 700. In another embodiment, the link-up component 700 can be disposed in the lamp device 11 and connected with the cover 410, wherein the link-up component 700 is adapted to drive the cover 410 to move relative to the main body 100. In this embodiment, the lighting module 300 is adapted to selectively face and correspond to the first reflecting component 411 or the second reflecting component 412. The image capturing module 200 comprises a lens 210 and a focus adjusting component 220. The link-up component 700 is connected with the focus adjusting component 220 and the cover 410, respectively. The focus adjusting component 220 is adapted to adjust a focal length of the lens 210. When the focal length of the focus adjusting component 220 is adjusted by the external force, the link-up component 700 is linked up by the focus adjusting component 220. Then, the link-up component 700 is adapted to move the cover 410 relative to the main body 100. The illumination fields of the lighting module 300 can be changed by the mechanical motion of the cover 410 in this embodiment.

Figure 10:
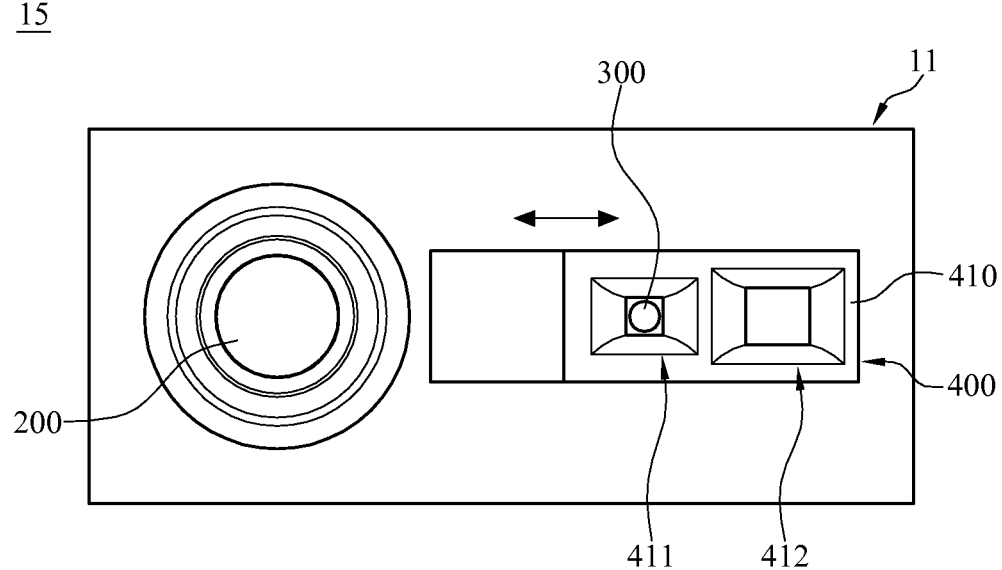
FIG. 10 is a perspective view of a photographing device according to a fifth embodiment of the disclosure.

In addition to the rotation, the cover 410 can be moved according to other methods. Pleases refer to FIG. 10. FIG. 10 is a perspective view of a photographing device according to a fifth embodiment of the disclosure. In this embodiment, the photographing device 15 comprises an image capturing module 200 and a lamp device 11. The lamp device 11 comprises a lighting module 300 and a cover 410. The cover 410 comprises a first reflecting component 411 and a second reflecting component 412. The cover 410 is adapted to move linearly along the image capturing module 200, to make the lighting module 300 selectively face and correspond to the first reflecting component 411 and the second reflecting component 412. Accordingly, the illumination fields can be formed different from each other in this embodiment.

In the scope of the disclosure, the lamp device 11 can be adapted to other fields about illumination besides the photographing device 10.

To sum up, embodiments of the disclosure provides a photographing device and a lamp device thereof. The cover of the reflection module may move relative to the main body. The light can be reflected by the first reflecting component or the second reflecting component to form illumination fields different from each other respectively. Additionally, the lighting module may match the change of the focal length of the image capturing module selectively relative to the first reflecting component or the second reflecting component. Accordingly, the beams emitted from the lighting module are reflected by the first reflecting component or the second reflecting component to adjust the illumination field of the lighting module. Thus, the brightness of a specific object and/or a monitored environment can be improved and the image quality can be improved relatively.

The disclosure will become more fully understood from the said embodiment for illustration only and thus does not limit the disclosure. Any modifications within the spirit and category of the disclosure fall in the scope of the disclosure.

What is claimed is:

1. A photographing device, comprising:
   a main body comprising a substrate;
   an image capturing module disposed on the main body;
   a lighting module disposed on the substrate; and
   a reflection module comprising a cover movably disposed on the main body, for making the cover have a first position and a second position relative to the main body, wherein the cover comprises a first reflecting component and a second reflecting component, the first reflecting component is adapted to make beams emitted from the lighting module form a first illumination field when the cover is located at the first position, the second reflecting component is adapted to make beams emitted from the lighting module form a second illumination field when the cover is located at the second position, so that the lighting module has at least two illumination fields different from each other accordingly,
wherein the reflection module includes a through hole, the through hole is formed in the cover and faces the image capturing module, the image capturing module is adapted to capture an image through the through hole.

2. The photographing device according to claim 1, wherein the reflection module further comprises a seat body, a blocking component and an elastic component, the cover is fixedly connected to an end of the seat body, the blocking component is fixedly connected to another end of the seat body, the substrate is disposed between the blocking component and the cover, an end of the elastic component is disposed on the blocking component, and the other end of the elastic component is connected with and pressed against the substrate.

3. The photographing device according to claim 2, wherein the seat body penetrates the substrate and the elastic component.

4. The photographing device according to claim 1, further comprising a motor and a control module, wherein the motor is connected with the cover, and adapted to drive the cover to move relative to the main body, the control module is connected with the motor and the image capturing module, when the image capturing module adjusts a focal length, the control module drives the motor to move relative to the main body according to the focal length adjusted by the image capturing module.

5. The photographing device according to claim 1, further comprising a link-up component, wherein the image capturing module comprises a lens and a focus adjusting component, the link-up component is connected with the focus adjusting component and the cover, the focus adjusting component is adapted to adjust a focal length of the lens, when the focal length is adjusted by the focus adjusting component, the link-up component is linked up by the focus adjusting component to drive the cover to move relative to the main body.

6. The photographing device according to claim 1, wherein the cover is adapted to move linearly along the image capturing module.

7. The photographing device according to claim 1, wherein the cover comprises at least two openings, the openings both include an inner wall surface to form the first reflecting component and the second reflecting component, when the cover is located at the first position, the first reflecting component is located at an illumination path of the beams emitted by the lighting module, when the cover is located at the second position, the second reflecting component is located at an illumination path of the beams emitted by the lighting module, such that the beams emitted by the lighting module emits outward through the inner wall surfaces and the openings to form the first illumination field and the second illumination field, respectively.

8. The photographing device according to claim 1, wherein the main body comprises a body connected to the substrate, the image capturing module is disposed in the through hole and an end of the image capturing module is disposed on the body.

9. A lamp device, comprising:
a main body;
a lighting module disposed on the main body;
a reflection module comprising a cover movably disposed on the main body, for making the cover have a first position and a second position relative to the main body, wherein the cover comprises a first reflecting component and a second reflecting component, the first reflecting component is adapted to make beams emitted from the lighting module form a first illumination field when the cover is located at the first position, the second reflecting component is adapted to make beams emitted from the lighting module form a second illumination field when the cover is located at the second position, so that the lighting module has at least two illumination fields different from each other accordingly; and
a link-up component connected with the cover, wherein the link-up component is adapted to drive the cover to move relative to the main body.

10. The lamp device according to claim 9, wherein the main body further comprises a substrate, the reflection module further comprises a seat body, a blocking component and an elastic component, the lighting module is disposed on the substrate, the substrate is disposed between the blocking component and the cover, the cover is fixedly connected to an end of the seat body, the blocking component is fixedly connected to another end of the seat body, the seat body penetrates the substrate and the elastic component, an end of the elastic component is disposed on the blocking component, and the other end of the elastic component is connected with and pressed against the substrate.

11. The lamp device according to claim 9, wherein when the cover is located at the first position, the first reflecting component is located at a illumination path of the beams emitted by the lighting module, when the cover is located at the second position, the second reflecting component is located at a illumination path of the beams emitted by the lighting module.

12. The lamp device according to claim 11, wherein the cover comprises at least two openings, the openings both include an inner wall surface to form the first reflecting component and the second reflecting component, such that the beams emitted by the lighting module emits outward through the inner wall surfaces and the openings to form the first illumination field and the second illumination field, respectively.

13. A photographing device, comprising:
a main body comprising a substrate;
an image capturing module disposed on the main body;
a lighting module disposed on the substrate; and
a reflection module comprising a cover movably disposed on the main body, for making the cover have a first position and a second position relative to the main body, wherein the cover comprises a first reflecting component and a second reflecting component, the first reflecting component is adapted to make beams emitted from the lighting module form a first illumination field when the cover is located at the first position, the second reflecting component is adapted to make beams emitted from the lighting module form a second illumination field when the cover is located at the second position, so that the lighting module has at least two illumination fields different from each other accordingly, the cover is adapted to move linearly along the image capturing module.

14. The photographing device according to claim 13, wherein the reflection module further comprises a seat body, a blocking component and an elastic component, the cover is fixedly connected to an end of the seat body, the blocking component is fixedly connected to another end of the seat body, the substrate is disposed between the blocking component and the cover, an end of the elastic component is disposed on the blocking component, and the other end of the elastic component is connected with and pressed against the substrate.

15. The photographing device according to claim 14, wherein the seat body penetrates the substrate and the elastic component.

16. The photographing device according to claim 13, further comprising a motor and a control module, wherein the motor is connected with the cover, the motor is adapted to drive the cover to move relative to the main body, the control module is connected with the motor and the image capturing module, when the image capturing module adjusts a focal length, the control module drives the motor to move relative to the main body according to the focal length adjusted by the image capturing module.

17. The photographing device according to claim 13, further comprising a link-up component, wherein the image capturing module comprises a lens and a focus adjusting component, the link-up component is connected with the focus adjusting component and the cover, the focus adjusting component is adapted to adjust a focal length of the lens, when the focal length is adjusted by the focus adjusting component, the link-up component is linked up by the focus adjusting component to drive the cover to move relative to the main body.

18. The photographing device according to claim 13, wherein the cover comprises at least two openings, the openings both include an inner wall surface to form the first reflecting component and the second reflecting component, when the cover is located at the first position, the first reflecting component is located at an illumination path of the beams emitted by the lighting module, when the cover is located at the second position, the second reflecting component is located at an illumination path of the beams emitted by the lighting module, such that the beams emitted by the lighting module emits outward through the inner wall surfaces and the openings to form the first illumination field and the second illumination field, respectively.

19. The photographing device according to claim 13, wherein the main body comprises a body connected to the substrate, the reflection module comprises a through hole, the image capturing module is disposed in the through hole and an end of the image capturing module is disposed on the body.

* * * * *